US006852979B1

(12) United States Patent
Kyushima et al.

(10) Patent No.: US 6,852,979 B1
(45) Date of Patent: Feb. 8, 2005

(54) PHOTOMULTIPLIER TUBE, PHOTOMULTIPLIER TUBE UNIT, RADIATION DETECTOR

(75) Inventors: Hiroyuki Kyushima, Hamamatsu (JP); Akira Atsumi, Hamamatsu (JP); Hideki Shimoi, Hamamatsu (JP)

(73) Assignee: Hamamatsu Photonics K. K., Hamamatsu (JP)

( * ) Notice: Subject to any disclaimer, the term of this patent is extended or adjusted under 35 U.S.C. 154(b) by 0 days.

(21) Appl. No.: 10/275,646

(22) PCT Filed: May 8, 2000

(86) PCT No.: PCT/JP00/02929

§ 371 (c)(1), (2), (4) Date: Nov. 8, 2002

(87) PCT Pub. No.: WO01/86692

PCT Pub. Date: Nov. 15, 2001

(51) Int. Cl.$^{7}$ .......................... G01T 1/164; H01J 43/28

(52) U.S. Cl. ...................... 250/366; 250/367; 250/368; 313/532

(58) Field of Search ................................ 250/366, 367, 250/368; 313/532

(56) References Cited

U.S. PATENT DOCUMENTS 4,005,292 A * 1/1977 Oesterlin et al. ........... 250/364
4,495,380 A * 1/1985 Ryan et al. ............. 174/138 D
5,442,181 A * 8/1995 Yamakawa et al. ......... 250/368
5,504,386 A * 4/1996 Kyushima et al. ...... 313/103 R
5,594,301 A * 1/1997 Sawai et al. ................ 313/523
5,886,465 A * 3/1999 Muramatsu et al. ........ 313/533
6,271,525 B1 * 8/2001 Majewski et al. .......... 250/367

FOREIGN PATENT DOCUMENTS

JP A 5-100034 4/1993
JP A 11-345587 12/1999
JP A 2000-149863 5/2000

* cited by examiner

*Primary Examiner*—Constantine Hannaher
*Assistant Examiner*—Shun Lee
(74) *Attorney, Agent, or Firm*—Oliff & Berridge, PLC

(57) ABSTRACT

A photomultiplier tube enhanced in simplicity and flexibility of mounting, a photomultiplier tube unit enhanced in photomultiplier tube assembling efficiency when unitized, and a radiation detector enhanced in assembling efficiency for a plurality of photomultiplier tubes. The photomultiplier tube (1) has a hermetically sealed vessel (5) easily screw-fixed in a predetermined position due to screwing means (30) provided in the stem plate (4). As a result, the photomultiplier tube (1) can be very easily attached or detached so that even an unskilled person can mount the photomultiplier tube (1) easily and accurately in a predetermined position by screwing.

14 Claims, 12 Drawing Sheets

PHOTOMULTIPLIER TUBE, PHOTOMULTIPLIER TUBE UNIT, RADIATION DETECTOR

TECHNICAL FIELD

The present invention relates to a photomultiplier tube for detecting weak light incident on a faceplate by multiplying electrons emitted from the faceplate, a photomultiplier tube unit including photomultiplier tubes, and a radiation detector employing photomultiplier tubes and/or photomultiplier tube units.

BACKGROUND ART

Japanese patent application Kokai publication No. 5-100034 discloses a scintillation camera wherein photomultiplier tubes are closely arranged together on a top surface of a scintillator. Sockets of the photomultiplier tubes are used for mounting the photomultiplier tubes onto the scintillator. A spiral spring is disposed around each socket, connecting each photomultiplier tube with a pressing plate facing the scintillator. A photocathode of the photomultiplier tube is pressed to the scintillator and fixed thereon by the spiral spring. In this way, a predetermined spring force is used to fix each photomultiplier tube on the scintillator.

However, a problem arose in the conventional photomultiplier tubes described above. Since the photomultiplier tube itself does not include a specific fixing means, various fixing parts such as a spring and pressing plate are required for fixing the photomultiplier tubes to predetermined locations. As a result, the mounting procedures for fixing the photomultiplier tube to a predetermined location becomes troublesome, making the fixing structure more complex. Further, when these photomultiplier tubes are incorporated in a predetermined photodetecting device, sockets for inserting stem pins of the photomultiplier tube is used to fix the photomultiplier tube into the photodetecting device.

In view of the foregoing, it is an object of the present invention to provide a photomultiplier tube with improved simplicity and flexibility of mounting.

It is another object to provide a photomultiplier tube unit capable of improving assembly operations of modularized photomultiplier tubes.

It is further object to provide a radiation detector capable of improving the efficiency of assembling a plurality of photomultiplier tubes.

DISCLOSURE OF INVENTION

A photomultiplier tube according to the present invention includes a photocathode for emitting electrons in response to light incident on a faceplate; an electron multiplier provided in an hermetically sealed vessel for multiplying electrons emitted from the photocathode; and an anode for generating an output signal based on electrons multiplied by the electron multiplier. The photomultiplier tube is characterized by the hermetically sealed vessel including a stem plate having stem pins for fixing the electron multiplier and the anode thereon; a metal side tube enclosing the electron multiplier and the anode, the metal side tube having an open end to which the stem plate is fixed; and the faceplate fixed to another open end of the side tube. The faceplate is made from glass. Screw means is provided at a lower surface of the stem plate.

By providing the stem plate with a screwing means, the photomultiplier tube of the present invention simplifies the process of fixing the hermetically sealed vessel to a predetermined location by using screws. Generally, photomultiplier tubes are not provided with its own special fixing structure in order to enhance its flexibility. Further, due to increased sensitivity properties of photomultiplier tubes in recent years, there have been more opportunities for incorporating such photomultiplier tubes in various devices. However, the operations required for mounting and replacing individual photomultiplier tubes in such equipment requires proficiency. In order to facilitate the mounting of photomultiplier tubes or the replacement of faulty photomultiplier tubes, screw means is provided on the stem plate of the photomultiplier tube according to the present invention. By standardizing the screwing means, it is possible to standardize a method of mounting photomultiplier tubes, thereby extremely simplifying the attachment and detachment operations and improving the flexibility of the photomultiplier tube. By employing such a simple operation as the insertion of screws, even an unskilled person can easily mount the photomultiplier tube at a predetermined position with accuracy.

In the photomultiplier tube according to the present invention, the screw means includes a spacer projecting from the lower surface of the stem plate. The spacer has a female thread in the interior thereof.

When a photomultiplier tube having the above structure is mounted at a predetermined position, the stem plate can be fixed in place while still maintaining spaced away from the mounting area by the spacer, thereby encouraging heat dissipation from the stem plate and contributing to improved performance of the photomultiplier tube. Further, by forming the spacer of an electrically insulating material, it is possible to prevent electrical effects of the photomultiplier tube operating at a high voltage from being transferred externally.

The photomultiplier tube according to present invention further includes a circuit board extending parallel to the stem plate and electrically connected to the stem pins. The circuit board is secured to the stem plate by screwing a male screw into the screw means. With the above structure, the circuit board is integrally attached to the photomultiplier tube be means of the male screws. The above structure simplifies the operation for assembling the circuit board and photomultiplier tube, decreasing the time required for assembly, and decreasing production cost. When either the circuit board or the photomultiplier tube malfunctions, the circuit board and photomultiplier tube can be easily separated. Therefore, the operations for replacing parts are facilitated.

The photomultiplier tube according to present invention may further include a first circuit board detachably provided with the stem plate. The first circuit board may be secured to the stem plate by screwing a screw member into the screw means through the first circuit board. If the screwing means has female threads, male screws are used as the screw member to fix the first circuit board to the stem plate. If the screwing means has male screws, nuts having female threads are used as the screw member for fixing the first circuit board to the stem plate The screw means may include a spacer projecting from the lower surface of the stem plate. Preferably, the spacer is integral with the stem plate by using the same material as that of the stem plate. The spacer spaces the first circuit board away from the stem plate. The screw member may be made from an electrically insulating material.

The screw means may include a spacer projecting from the lower surface of the stem plate. Preferably, the spacer is made from an electrically insulating material. The spacer spaces the first circuit board away from the stem plate. In this case, the screw member made from an electrically insulating material is preferably used.

The photomultiplier tube according to present invention may further include a second circuit board detachably provided with the stem plate and the first circuit board. The first and second circuit boards may be secured to the stem plate by screwing the screw member into the screw means through the first and second circuit boards.

A photomultiplier tube unit according to the present invention includes a plurality of photomultiplier tubes that are juxtaposed, each of the plurality of the photomultiplier tubes having a photocathode for emitting electrons in response to light incident on a faceplate; an electron multiplier provided in an hermetically sealed vessel for multiplying electrons emitted from the photocathode; and an anode for generating an output signal based on electrons multiplied by the electron multiplier. The hermetically sealed vessel includes: a stem plate having stem pins for fixing the electron multiplier and the anode thereon; a metal side tube enclosing the electron multiplier and the anode, the side tube having one open end to which the stem plate is fixed; and the faceplate fixed to another open end of the side tube. The faceplate is made from glass. Screw means is provided on a lower surface of the stem plate. The hermetically sealed vessels are secured on a single substrate by screwing male screw members into the screw means while the hermetically sealed vessels are juxtaposed on the substrate.

In the above photomultiplier tube unit, it is possible to arrange a plurality of photomultiplier tubes on a single circuit board using male screw members. This structure enables the photomultiplier tubes to be modularized with the simple operation of inserting screws. Hence, it is possible to facilitate the attaching and detaching operations of a plurality of photomultiplier tubes on a single circuit board and the replacement of individual photomultiplier tubes in the event of a malfunction. When modularizing the photomultiplier tubes, these photomultiplier tubes can be easily incorporated into a variety of equipment.

In the photomultiplier tube unit according to present invention, the substrate is a circuit board electrically connectable to the stem pins. The male screw members are electrically insulating screws. With this structure, a plurality of photomultiplier tubes is easily mounted on a single circuit board by means of the male screw members. Accordingly, the operation for assembling the circuit board and a plurality of the photomultiplier tubes is facilitated. The time required for the assembly operation is shortened. The costs of the product are reduced. When either the circuit board or the photomultiplier tube malfunctions, the circuit board and photomultiplier tube can be easily separated. The above structure facilitates such operations as replacing parts and avoiding discarding the entire unit.

A radiation detector according to the present invention includes a scintillator for emitting fluorescent light in response to radiation generated from an object; a plurality of photomultiplier tubes arranged in a manner that faceplates of the photomultiplier tubes face the scintillator. Each of the photomultiplier tubes generates an electrical charge based on the fluorescent light emitted from the scintillator. The radiation detector includes a position calculating processor for processing an output from the photomultiplier tube and generating a signal for indicating a position of radiation generated in the object. Each of the plurality of photomultiplier tubes has a photocathode for emitting electrons in response to light incident on a faceplate; an electron multiplier provided in an hermetically sealed vessel for multiplying electrons emitted from the photocathode; and an anode for producing an output signal based on electrons multiplied by the electron multiplier. The hermetically sealed vessel includes: a stem plate having stem pins for securing the electron multiplier and the anode; a metal side tube for enclosing the electron multiplier and the anode, the side tube having one open end to which the stem plate is fixed; and the faceplate fixed to another open end of the side tube, the faceplate being made from glass. Screw means is provided at a lower surface of the stem plate. The hermetically sealed vessels are arranged to be secured to a single substrate by screwing male screws into the screw mean members while the hermetically sealed vessels are juxtaposed on the substrate.

Since the radiation detector employs units including a plurality of photomultiplier tubes arranged on a single circuit board and fixed by male screw members, a complex process is not required when replacing individual photomultiplier tubes in radiation detectors (such as a gamma camera) in which a plurality of photomultiplier tubes are incorporated. Replacement operations can be performed on individual units. Therefore, the time required for the replacement operation is reduced. Moreover, by employing a structure using screws, it is possible to facilitate the operation for attaching and detaching each photomultiplier tube in relation to the circuit board and for replacing individual photomultiplier tubes in the detached units.

BEST MODE FOR CARRYING OUT THE INVENTION

The following description will be made for explaining preferred embodiments of a photomultiplier tube, a photomultiplier tube unit, and a radiation detector according to the present invention in details, referring to the accompanying drawings.

Figure 1:
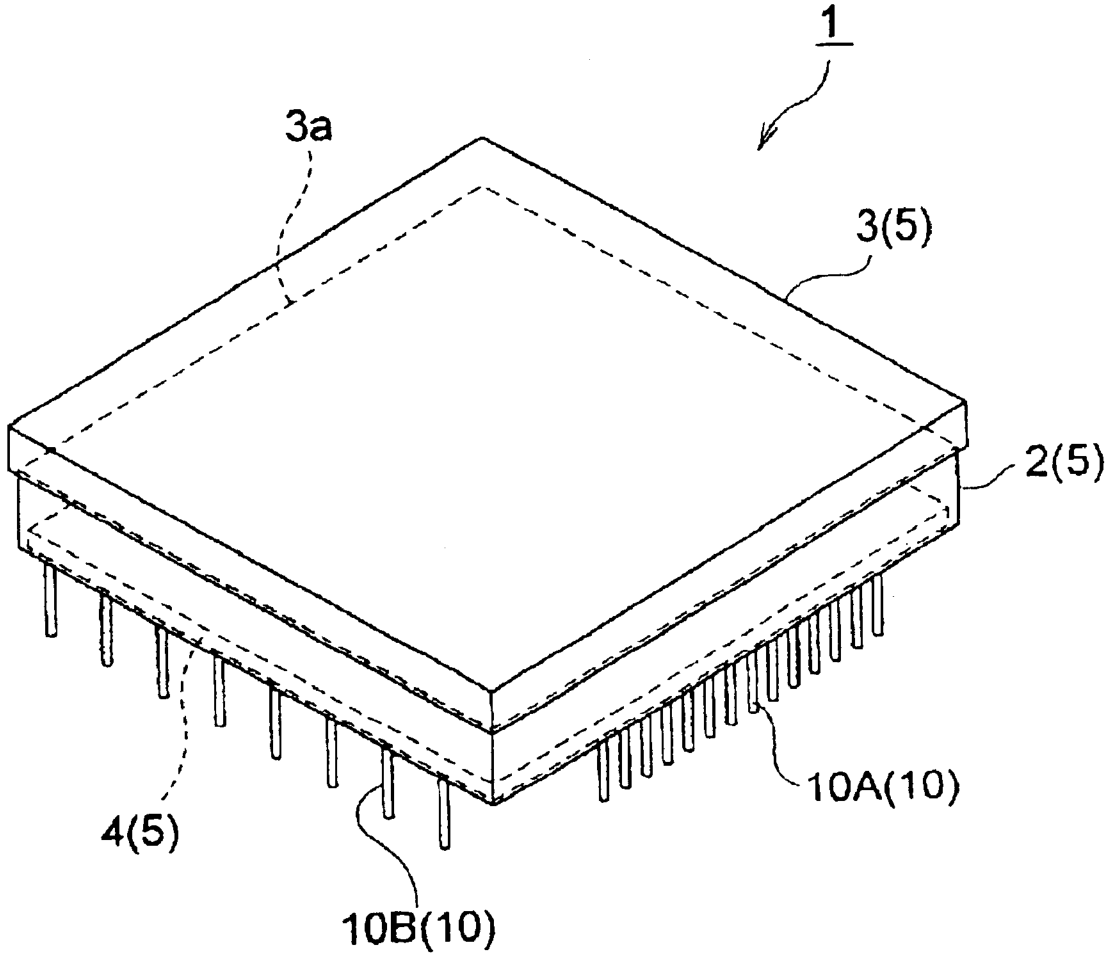
FIG. 1 is a perspective view showing one embodiment of a photomultiplier tube according to the present invention.
Figure 2:
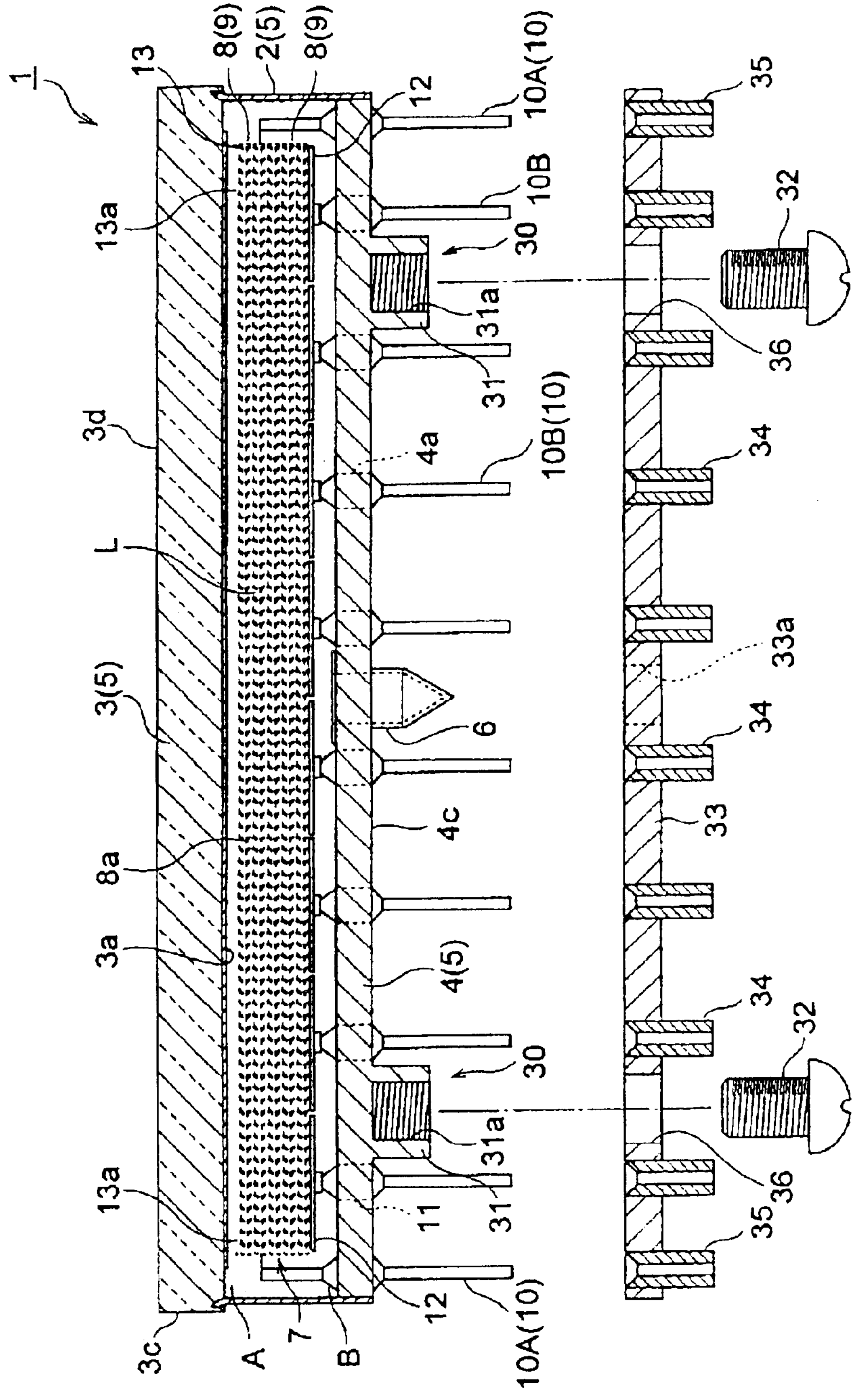
FIG. 2 is a cross-sectional view showing a relationship among the photomultiplier tube in FIG. 1, a circuit board, and screws.

FIG. 1 is a perspective view showing a photomultiplier tube according to the present invention. FIG. 2 is a cross-sectional view of the photomultiplier tube in FIG. 1. The photomultiplier tube 1 includes a side tube 2 having a substantially rectangular section and formed from a metal material (such as Kovar metal and stainless steel). A glass faceplate 3 is fused to one open end A of the side tube 2. A photocathode 3*a* for converting light to an electron is formed on an inner surface of the faceplate 3. The photocathode 3*a* is formed by reacting alkali metal vapor with antimony pre-deposited on the faceplate 3. A stem plate 4 made from a metal material (such as Kovar metal and stainless steel) is welded to the other open end B of the side tube 2. The assembly of the side tube 2, faceplate 3, and stem plate 4 forms a hermetically sealed vessel 5. The vessel 5 has a low height of approximately 10 mm.

A metal evacuating tube 6 is provided in the center of the stem plate 4. The evacuating tube 6 is used to evacuate the vessel 5 by a vacuum pump (not shown) after the assembly of the photomultiplier tube 1 is over. The evacuating tube 6 is also used for introducing alkali metal vapor into the vessel 5 during the production of the photocathode 3*a*.

A stacked electron multiplier 7 in a block shape is disposed inside the vessel 5. The electron multiplier 7 has an electron multiplying section 9 in which ten stages of flat dynodes 8 are stacked. Stem pins 10 formed from Kovar metal penetrate the stem plate 4 and support the electron multiplier 7 in the vessel 5. The tip of each stem pin 10 is electrically connected to each dynode 8. Pinholes 4*a* are formed in the stem plate 4, enabling the stem pins 10 to penetrate the stem plate 4. Each of the pinholes 4*a* is filled with a tablet 11 formed from Kovar glass, which forms a hermetic seal between the stem pins 10 and the stem plate 4. Each stem pin 10 is fixed to the stem plate 4 by the tablet 11. The stem pins 10 are classified into two groups: one group for dynode pins 10A connected individually to each dynode 8, and the other group for anode pins 10B connected individually to each of anodes 12 described later.

The anodes 12 are positioned below the electron multiplying section 9 in the electron multiplier 7. The anodes 12 are fixed to the top ends of the anode pins 10B. A flat focusing electrode 13 is disposed between the photocathode 3*a* and the electron multiplying section 9 above the top stage of the electron multiplier 7. A plurality of slit-shaped openings 13*a* is formed in the focusing electrode plate 13. The openings 13*a* are arranged parallel to each other with respect to one direction. Slit-shaped electron multiplying holes 8*a* are formed in the dynode 8. The number of electron multiplying holes 8*a* is the same as that of the openings 13*a*. The electron multiplying holes 8*a* are arranged parallel to each other in one direction. The electron multiplying holes 8*a* extend in a direction substantially orthogonal to the surface of the dynodes 8.

Electron multiplying paths L are formed by arranging the electron multiplying holes 8*a* in each dynode 8 along the direction of the stack. A plurality of channels are formed in the electron multiplier 7 by associating the path L with the corresponding opening 13*a* in the focusing electrode plate 13. The anodes 12 are configured in an 8×8 arrangement, so that each anode 12 corresponds to a predetermined number of channels. Since the anode 12 is connected to the corresponding anode pin 10B, output signals can be extracted through each anode pin 10B.

Hence, the electron multiplier 7 has a plurality of linear channels. A predetermined voltage is applied across the electron multiplying section 9 and anodes 12 by the stem pin 10 connected to a bleeder circuit (not shown). The photocathode 3*a* and the focusing electrode plate 13 are maintained at the same potential. The potential of each dynode is decreasing from the top of the dynode toward the anodes 12. Accordingly, incident light on the faceplate 3 is converted to electrons at the photocathode 3*a*. The electrons are guided into a certain channel by the electron lens effect generated by the focusing electrode plate 13 and the first stage of the dynode 8 on the top of the electron multiplier 7. The electrons guided into the channel are multiplied through each stage of the dynodes 8 while passing through the electron multiplying paths L. The electrons are collected by the anodes 12 to be outputted as an output signal.

Figure 3:
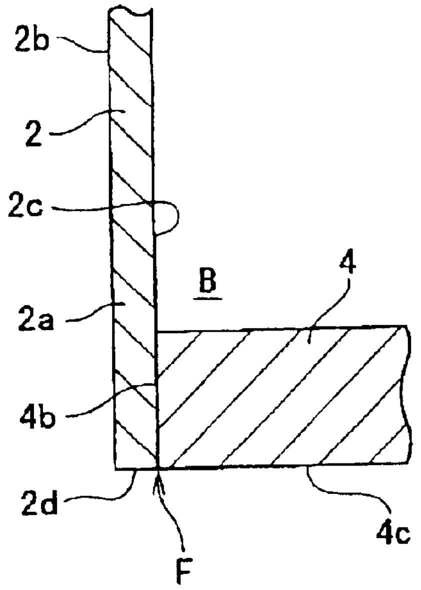
FIG. 3 is an enlarged cross-sectional view showing the relevant portion of the photomultiplier tube of FIG. 2.

As shown in FIG. 3, the stem plate 4 is brought into contact with the open end B of the side tube 2 such that a side face 4*b* of the stem plate 4 contacts an inner surface 2*c* in the vicinity of a lower end 2*a* of the side tube 2. When welding the side tube 2 and the stem plate 4, made of metal, together to form a hermetic seal, a lower end face 2*d* of the side tube 2 is approximately flush with a lower face 4*c* of the stem plate 4 in order that the lower end surface 2*d* does not project below the stem plate 4. In other words, the above structure extends the lower end 2*a* of the side tube 2 in the substantial axial direction of the tube 2, and eliminates lateral projection like a flange at the lower end of the photomultiplier tube 1. In this embodiment, a junction F between the side tube 2 and stem plate 4 is laser-welded by irradiating a laser beam on the junction F from a point directly below and external to the junction F or in a direction toward the junction F.

By eliminating the flange-like overhang at the lower end of the photomultiplier tube 1, it is possible to reduce the external dimensions of the photomultiplier tube 1, though the above structure of the photomultiplier tube 1 and the side tube 2 may be improper for resistance-welding. Further, when several photomultiplier tubes 1 are arranged, it is possible to minimize dead space between neighboring photomultiplier tubes 1 as much as possible by placing the neighboring side tube 2 of the photomultiplier tubes 1 close together. Laser welding is employed to bond the stem plate 4 and side tube 2 together in order to achieve a thin structure of the photomultiplier tube 1 and to enable high-density arrangements of the photomultiplier tube 1.

The above laser welding is one example for fusing the stem plate 4 and side tube 2. When the side tube 2 and the stem plate 4 are welded together using the laser welding, it is unnecessary to apply pressure across the junction F between the side tube 2 and stem plate 4 in contrast to resistance welding. Hence, no residual stress is induced at the junction F, avoiding cracks from occurring at this junction during the usage. The usage of the laser welding greatly improves the durability and sealability of the photomultiplier tube 1. Laser welding and electron beam welding prevent generation of heat at the junction F, compared to the resistance welding. Hence, when the photomultiplier tube 1 is assembled, there is very little effect of heat on the components in the vessel 5.

Figure 4:
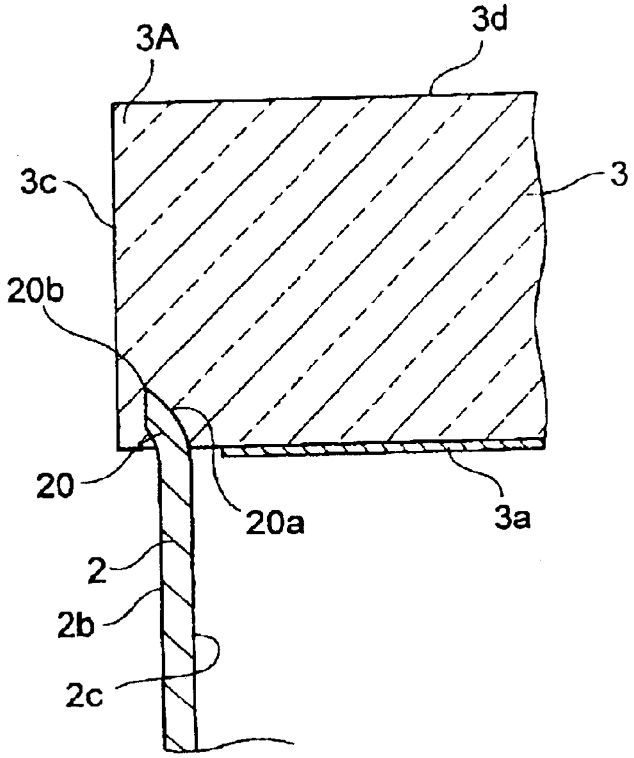
FIG. 4 is an enlarged cross-sectional view showing the relevant portion of the photomultiplier tube of FIG. 2.

The side tube 2 is formed by pressing a flat plate made from metal such as Kovar and stainless steel into an approximately rectangular cylindrical shape having a thickness of approximately 0.25 mm and a height of approximately 7 mm. The glass faceplate 3 is fixed to the open end A of the side tube 2 by fusion. As shown in FIG. 4, an edge portion 20 is formed on an upper end of the side tube 2 which the glass faceplate 3 faces. The edge portion 20 is provided around the whole upper end of the side tube 2. The edge portion 20 curves outwardly with a curved part 20*a* formed on an inner surface 2*c* side of the side tube 2. A tip 20*b* of the edge portion 20 is formed like a knife-edge. Hence the top of the side tube 2 can easily pierce the glass faceplate 3, thereby facilitating the assembly process and improving reliability when the side tube 2 and glass faceplate 3 are fused together.

When fixing the side tube 2 with an edge portion 20 having the above shape to the glass faceplate 3, the metal side tube 2 is placed on a rotating platform (not shown) with the bottom surface of the glass faceplate 3 contacting the tip 20*b* of the edge portion 20. Next, the side tube 2 is heated by a high-frequency heating device while the glass faceplate 3 is pressed downwardly by a pressure jig. At this time, the heated edge portion 20 gradually melts the glass faceplate 3, and penetrates therein. As a result, the edge portion 20 is brought into embedded in the glass faceplate 3, ensuring a tight seal at the juncture between the glass faceplate 3 and side tube 2.

The edge portion 20 extends upwardly from the side tube 2 rather than extends laterally from the side tube 2 like a flange. When embedding the edge portion 20 into the glass faceplate 3 as close to a side surface 3*c* as possible, it is possible to increase the effective surface area of the glass faceplate 3 to nearly 100% and to minimize the dead area of the glass faceplate 3 to nearly 0%.

When the side surface 3*c* of the glass faceplate 3 is extended by a predetermined length external from the outer surface 2*b* of the side tube 2, an overhanging part 3A having a predetermined length of extension is formed in the glass faceplate 3, expanding the effective surface area of a photocathode 3*a* formed on the glass faceplate 3. When the glass faceplate 3 is fused to the metal side tube 2, the above fusing method for fusing glass and metal is employed due to the combination of metal and glass. The overhanging part 3A of the glass faceplate 3 functions extremely effectively to ensure a fusing area necessary to fuse the glass faceplate 3 and side tube 2. The increase of the amount of overhang in the overhanging part 3A avoids the side surface 3*c* from deformating during the fusion process, allowing the side surface 3*c* to retain its form throughout the process.

Figure 5:
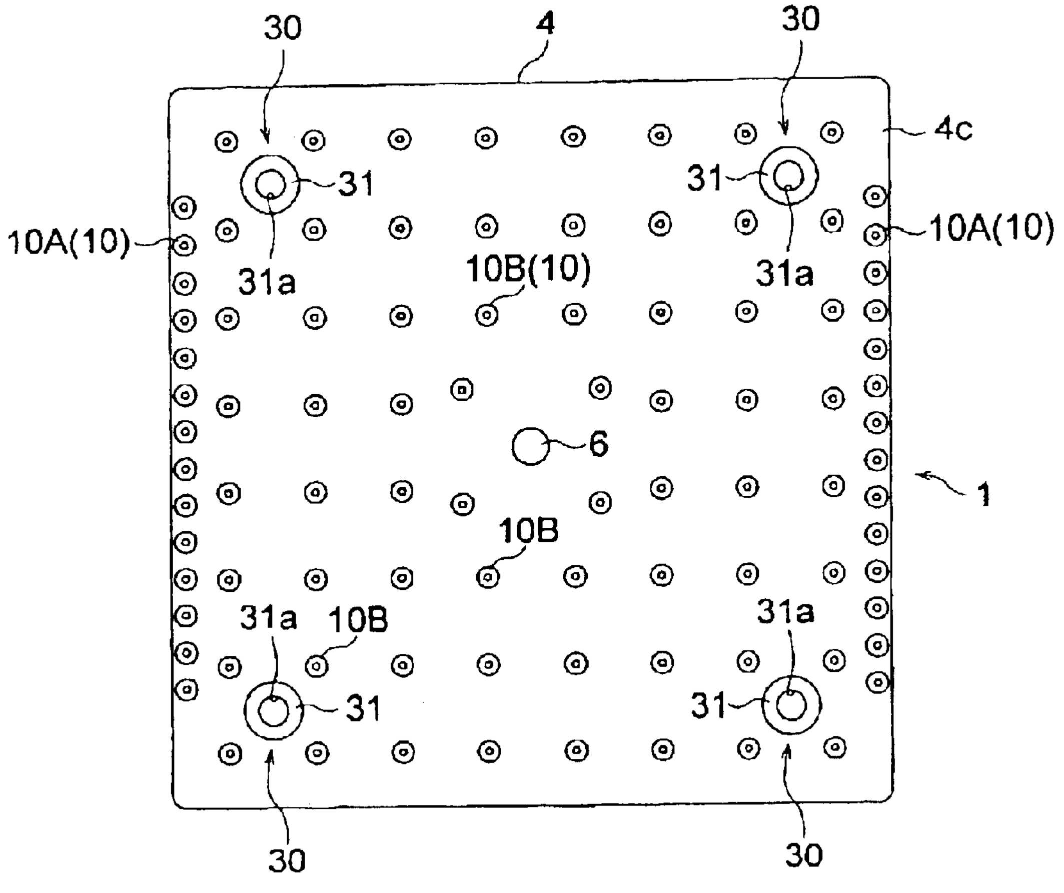
FIG. 5 is a bottom view of the photomultiplier tube.

As shown in FIGS. 2 and 5, the photomultiplier tube 1 has four threaded portions 30. Each threaded portion 30 is provided in each corner of the stem plate 4. The threaded portion 30 includes a cylindrical spacer 31 projecting from the lower surface 4*c* of the stem plate 4. The cylindrical spacer 31 has a female threaded hole 31*a* therein. The cylindrical spacer 31 is made from the same material as that of the stem plate 4, and integrally molded with the stem plate 4. The cylindrical spacer 31 may be made from electrically insulating material such as resin separately from the stem plate 4.

By forming the threaded portions 30 with the stem plate 4, the vessel 5 can be easily mounted at a predetermined position. Additionally, standardization of the threaded portions 30 may contribute to standardizing a method for fixing the photomultiplier tube 1. For example, when a photomultiplier tube 1 in a photodetector malfunctions, a photomultiplier tube 1 having the same standard specifications can be easily installed at the same position in a correct manner in the photodetector. When the photomultiplier tube 1 is mounted at a predetermined position of a substrate, the stem plate 4 is spaced away from the substrate by the cylindrical spacer 31. The above structure ensures heat dissipation from the stem plate 4, and contributes to the enhanced performance of the photomultiplier tube 1. When the cylindrical spacer 31 is formed from an electrically insulating material, it is possible to prevent the electrical effects of the photomultiplier tube 1 operating at a high voltage from being transferred externally.

Figure 6:
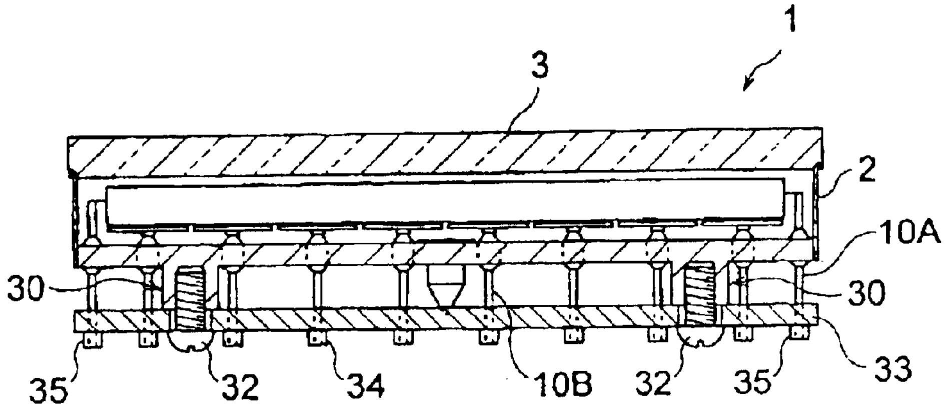
FIG. 6 is a cross-sectional view showing the photomultiplier tube of FIG. 1 integrally fixed to the circuit board by the screws.
Figure 7:
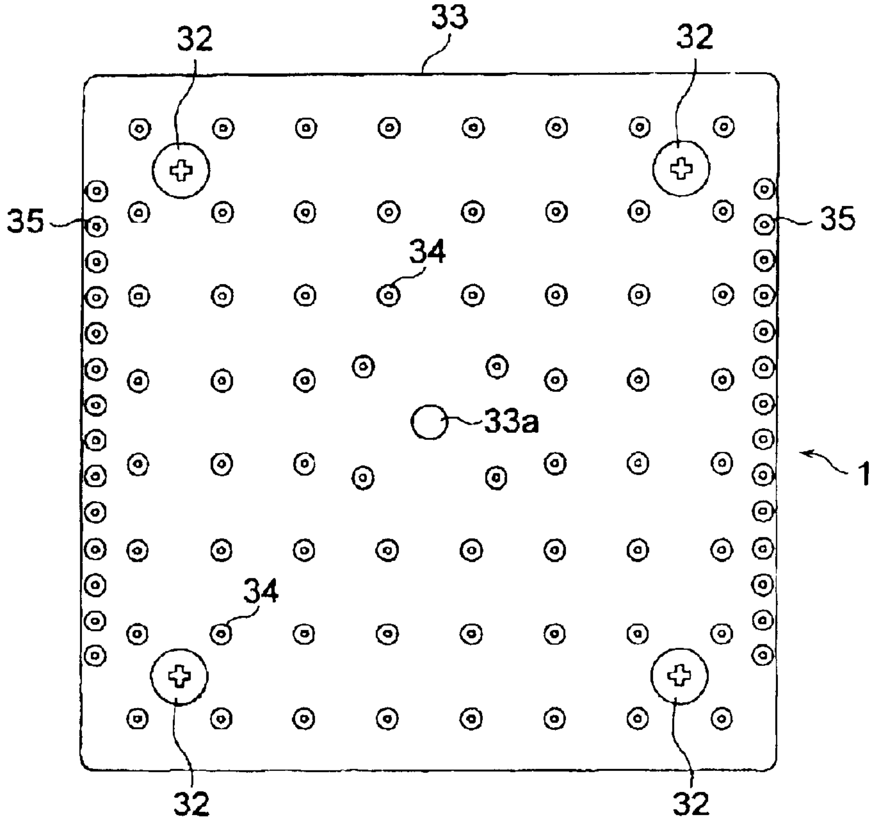
FIG. 7 is a bottom view showing the photomultiplier tube integrally fixed to the circuit board by screws shown in FIG. 6.

Next, another embodiment of the photomultiplier tube 1 having the threaded portions 30 will be described. Referring to FIGS. 2, 6, and 7, a voltage dividing circuit (bleeder circuit) which is connectable to the dynode pins 10A, or a first circuit board 33 which is connectable to the anode pins 10B and has circuit patterns for anode output may be fixed to the photomultiplier tube 1. The first circuit board 33 has metal socket pins 34 corresponding to the anode pins 10B and metal socket pins 35 corresponding to the dynode pins 10A. An evacuating tube insertion hole 33*a* for inserting the evacuating tube 6 is formed in the center of the first circuit board 33. Screw insertion holes 36 are formed in the first circuit board 33 at positions corresponding to the spacers 31. After the anode pins 10B and dynode pins 10A are inserting into the socket pins 34 and socket pins 35, and the screw insertion holes 36 is aligned with the female thread 31*a* of the spacers 31, electrical insulated screws 32 (male screws) are screwed into the female threaded holes 31*a* from below, thereby fixing the first circuit board 33 integrally to the photomultiplier tube 1 and parallel to the stem plate 4.

As described above, the first circuit board 33 is integrally fixed to the photomultiplier tube 1 by using the screws 32. This structure facilitates the operation for assembling the first circuit board 33 and the photomultiplier tube 1. As a result, the time required for assembly can be shortened and the cost of the product reduced. In case when either the first circuit board 33 or the photomultiplier tube 1 malfunction, the photomultiplier tube 1 can easily be separated from the first circuit board 33. Therefore, the operation for replacing parts can be facilitated.

Figure 8:
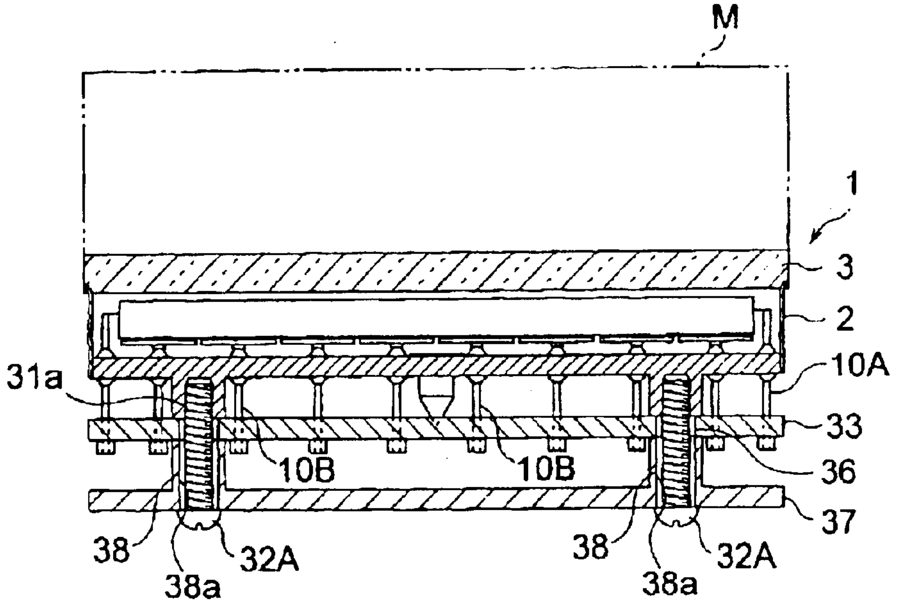
FIG. 8 is a cross-sectional view showing the photomultiplier tube fixed to two circuit boards by the screws.
Figure 9:
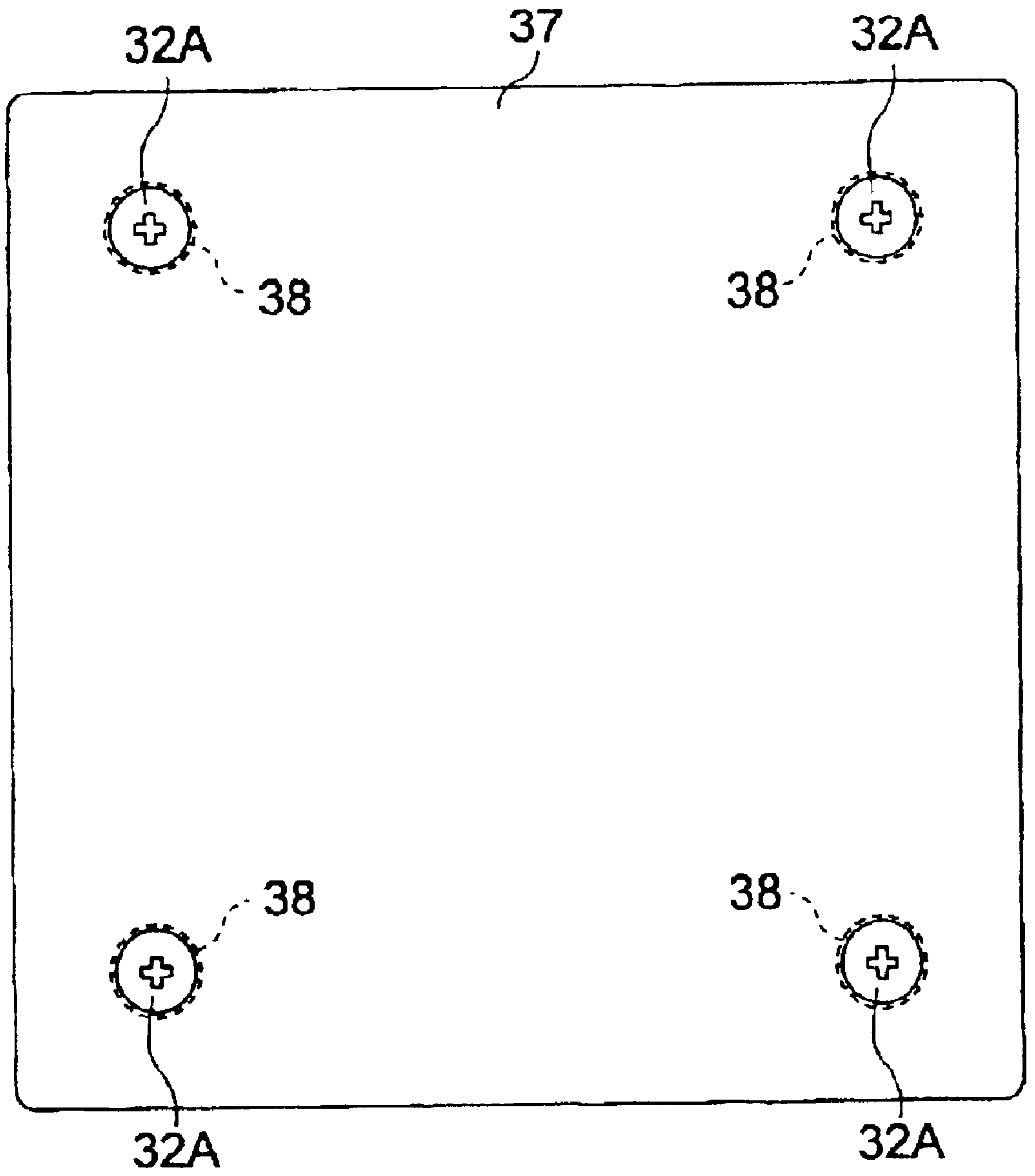
FIG. 9 is a bottom view showing two circuit boards integrally fixed to the photomultiplier tube of FIG. 8 by screws.

As shown in FIGS. 8 and 9, a second circuit board 37 may be fixed parallel to the first circuit board 33 under the bottom side of the first circuit board 33. The second circuit board 37 is electrically connected to the first circuit board 33 through connecting pins (not shown), and has a function for calculating a position such as an AD converter. Spacers 38 that are electrically isolated and cylindrical in shape protrude from the top surface of the second circuit board 37 at positions corresponding to the screw insertion holes 36 formed in the first circuit board 33. The spacers 38 maintain the first circuit board 33 and second circuit board 37 at a predetermined distance from each other. A screw insertion hole 38*a* is formed in each spacer 38. Electrically insulating screws 32A (male screws) are screwed into the female threads 31*a* through the screw insertion holes 38*a* to fix the first circuit board 33 and second circuit board 37 integrally to the photomultiplier tube 1. Since the first circuit board 33 and second circuit board 37 are fixed to the photomultiplier tube 1 by screws, these three parts can easily be separated by unscrewing the screws. Further, a scintillator M may be integrally fixed to the faceplate 3 of the photomultiplier tube 1.

Next, a preferred embodiment of a photomultiplier tube unit and a radiation detector according to the present invention will be described.

Figure 10:
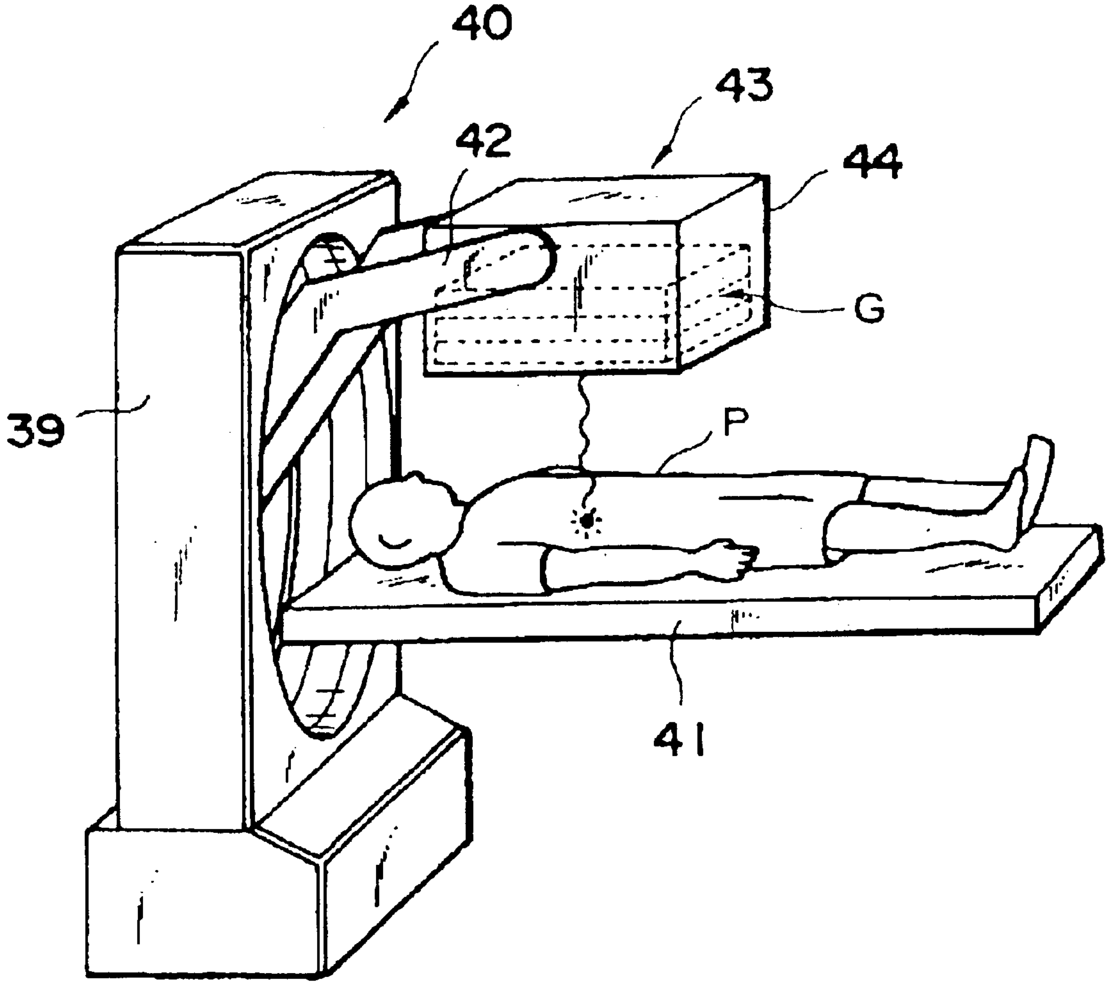
FIG. 10 is a perspective view showing an embodiment of a radiation detector according the present invention.

As shown in FIG. 10, a radiation detector 40 is a gamma camera as one example. The radiation detector 40 has been developed as a diagnostic device used in nuclear medicine. The gamma camera 40 has a detecting unit 43 supported by an arm 42 of a support frame 39. The detecting unit 43 is positioned directly above a bed 41 on which a patient P serving as the object of examination reclines.

Figure 11:
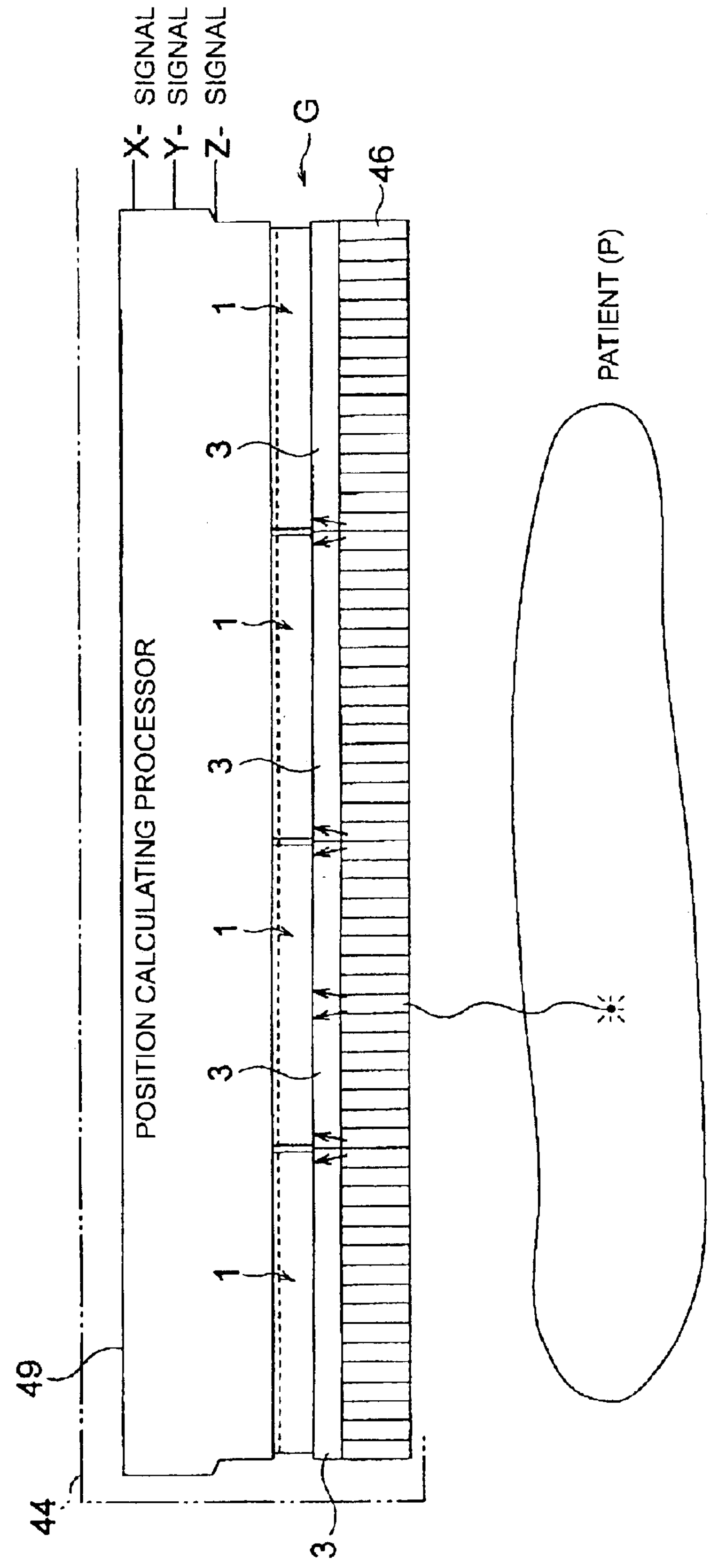
FIG. 11 is a side view showing the internal structure of a detecting unit used in the radiation detector.

As shown in FIG. 11, a casing 44 of the detecting unit 43 accommodates a scintillator 46 which is positioned opposite to the patient. The scintillator 46 is fixed directly to a group of photomultiplier tubes G without an interposing glass light guide. The group of photomultiplier tubes G includes a plurality of photomultiplier tubes 1 arranged densely in a matrix configuration. The faceplate 3 of each photomultiplier tubes 1 is orientated downwardly to the scintillator 46 in order to directly receive fluorescent light emitted from the scintillator 46. A conventional light guide is no longer needed, because the thickness of the faceplate 3 is increased to compensate for the thickness of the light guide.

A position calculating processor 49 is provided in the casing 44 for performing calculations based on electrical charges from each photomultiplier tube 1. The group of photomultiplier tubes G is fixed to the position calculating processor 49 by screw means. The position calculating processor 49 electrically connected to the group of photomultiplier tubes G generates an X signal, a Y signal, and a Z signal to form a three-dimensional image on a display (not shown). Gamma rays emitted from the affected part of the patient P are converted to predetermined fluorescent light by the scintillator 46. Each of the photomultiplier tubes 1 converts the energy of this fluorescent light into electrical charges. The position calculating processor 49 generates positions signals based on the electrical charges. In this way, it is possible to monitor the distribution of radiation energy from the object on the display for use in diagnoses.

While the above description has been given for the gamma camera 40 as one example of a radiation detector, another radiation detector used in nuclear medicine diagnoses is a Positron CT (commonly designated as PET). This apparatus also includes many the photomultiplier tubes 1.

Figure 12:
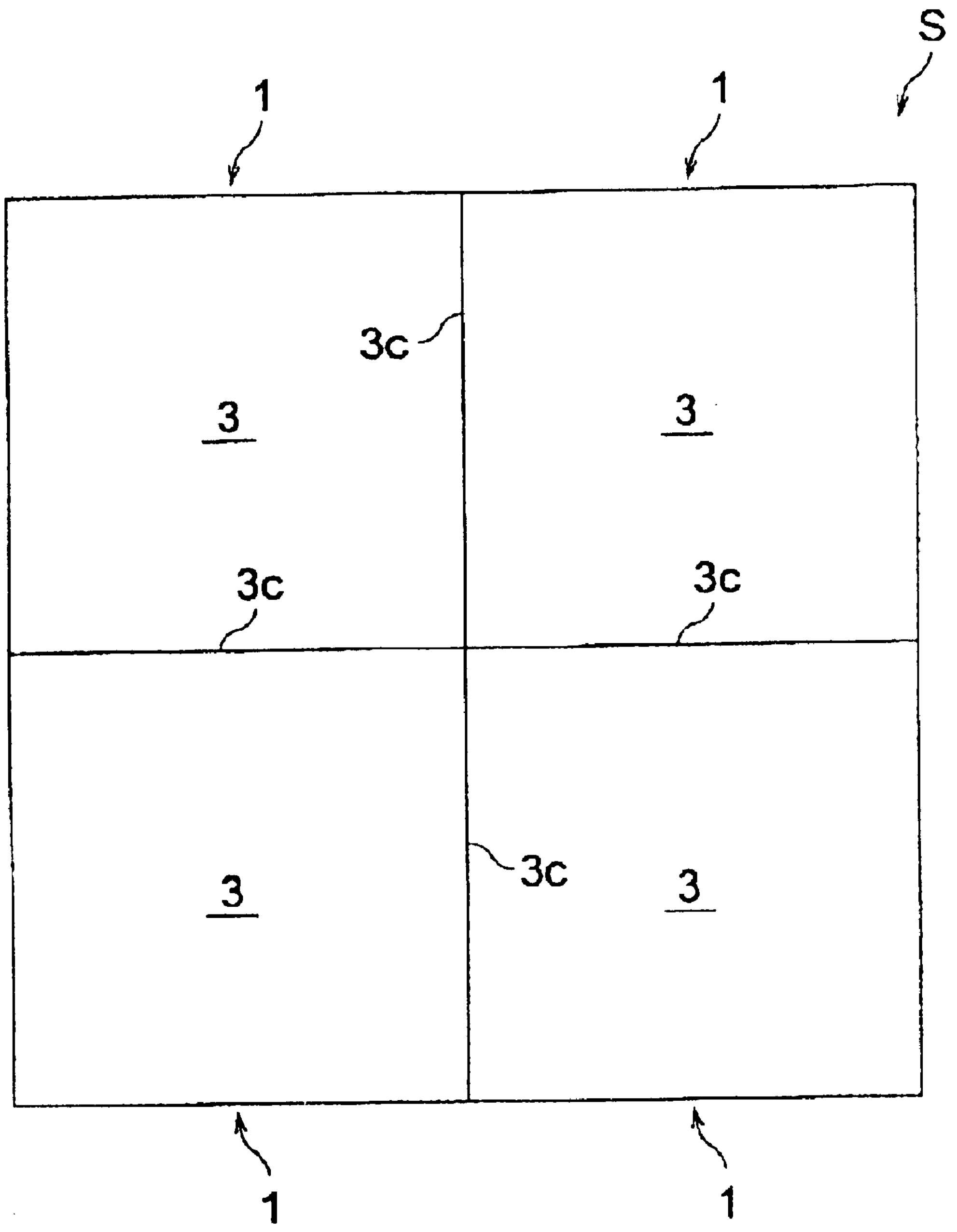
FIG. 12 is a plan view showing an embodiment of a photomultiplier tube unit according to the present invention.

Further, the group of photomultiplier tubes G has the photomultiplier tubes 1 arranged in a matrix, as described above. As shown in FIG. 12, the group of photomultiplier tubes G includes a photomultiplier tube unit S having four 2×2 of the photomultiplier tubes 1. The arrangement of the photomultiplier tubes 1 in the unit S is one example.

Next, the matrix-shaped photomultiplier tube unit S will be described in detail, wherein components having the same structure as those of the components shown in FIG. 8 are represented by the same numerals.

Figure 13:
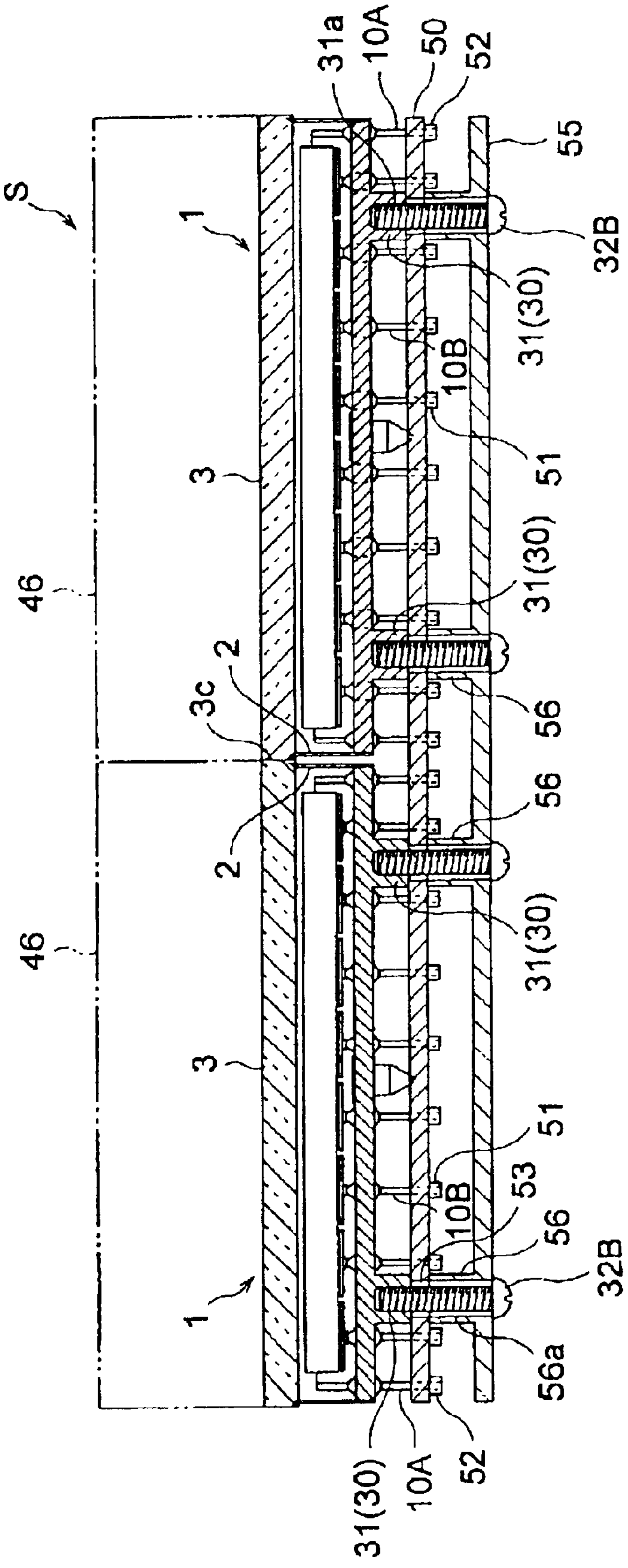
FIG. 13 is a cross-sectional view showing the photomultiplier tube unit.
Figure 14:
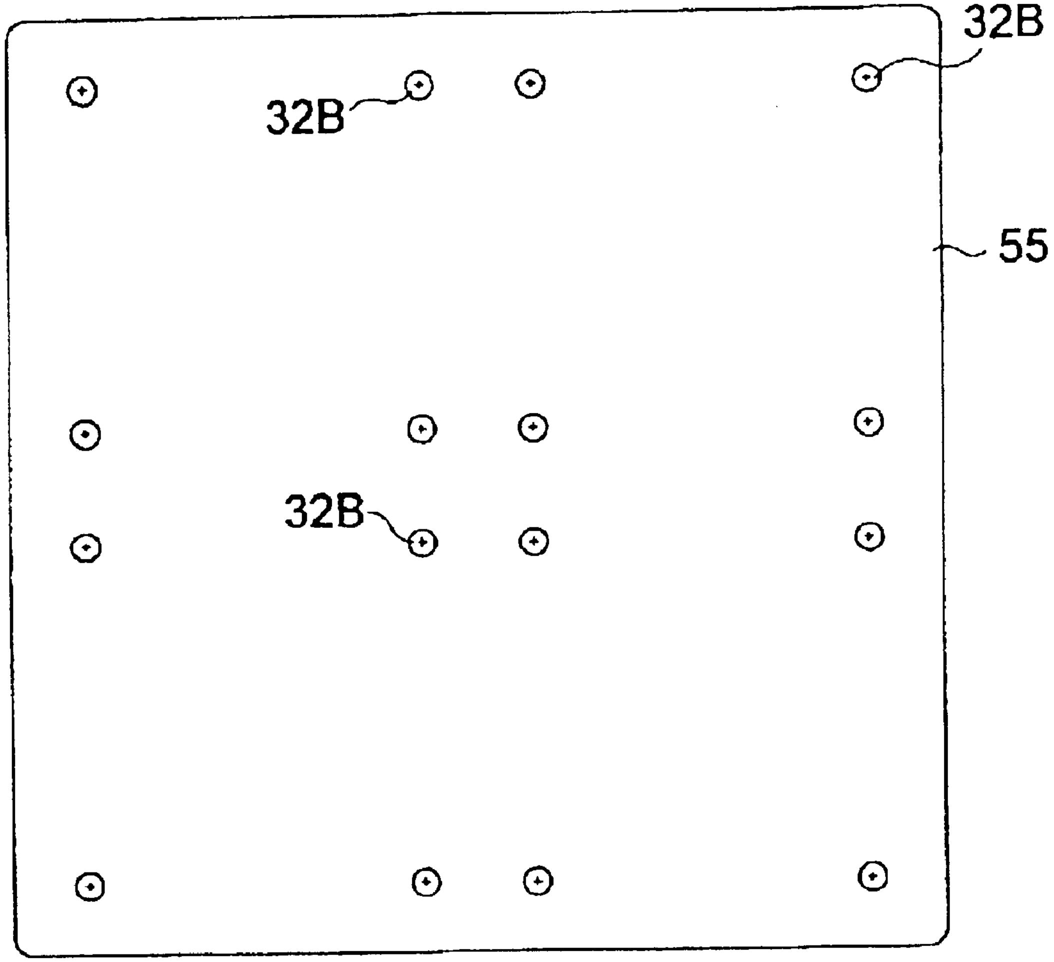
FIG. 14 is a bottom view showing the photomultiplier tube unit.

As shown in FIGS. 12 and 13, when configuring a photomultiplier tube unit S using the photomultiplier tubes 1 described above, the photomultiplier tubes 1 having the same structure are arranged in a 2×2 matrix. The neighboring side surfaces 3*c* of the four faceplates 3 are in close contact, while neighboring side tubes 2 are separated from one another. Neighboring faceplates 3 can be easily and reliably fixed together by adhesive.

The stem plate 4 of each photomultiplier tube 1 in the 2×2 photomultiplier tube unit S has a cylindrical spacer 31, as one example of the threaded portions 30. The photomultiplier tubes 1 are arranged on an upper surface of a single first circuit board 50. The first circuit board 50 may include a voltage dividing circuit (bleeder circuit) which is connectable to each of the dynode pins 10A, or a circuit pattern which is connectable to each of the anode pins 10B for extracting anode output. The first circuit board 50 is also provided with metal socket pins 51 corresponding to anode pins 10B and metal socket pins 52 corresponding to dynode pins 10A.

A single second circuit board 55 is provided under the first circuit board 50 and parallel thereto. The second circuit board 55 is electrically connected to the first circuit board 50 through connecting pins (not shown). The second circuit board 55 has a function for calculating a position, such as an AD converter. Spacers 56 that are electrically isolated and cylindrical in shape protrude from the top surface of the second circuit board 55 at positions corresponding to screw insertion holes 53 formed in the first circuit board 50. The spacers 56 maintain a predetermined interval between the first circuit board 50 and the second circuit board 55. Screw insertion holes 56*a* are formed in the spacers 56. Electrically insulating screws 32B (male screws) are screwed into the 31*a* through the female threads 56*a* to fix the first circuit board 50 and second circuit board 55 integrally to the four photomultiplier tubes 1. Each photomultiplier tube 1 can be easily separated from the first circuit board 50 and second circuit board 55 by unscrewing the screws. The scintillator 46 may also be integrally fixed to the faceplate 3 of each photomultiplier tube 1.

With this structure, a plurality of the photomultiplier tubes 1 are integrally mounted onto the first circuit board 50 and second circuit board 55 using the male screws 32B. Accordingly, this structure simplifies the assembly of the first circuit board 50, the second circuit board 55, and the photomultiplier tube 1, thereby reducing the assembly time and reducing the cost of the product. In case that any one of the first circuit board 50, the second circuit board 55, and the photomultiplier tube 1 malfunctions, the first circuit board 50, the second circuit board 55, and the photomultiplier tube 1 can be easily separated, thereby facilitating the operation of replacing parts. Additionally, discarding the entire unit may be avoided.

Figure 15:
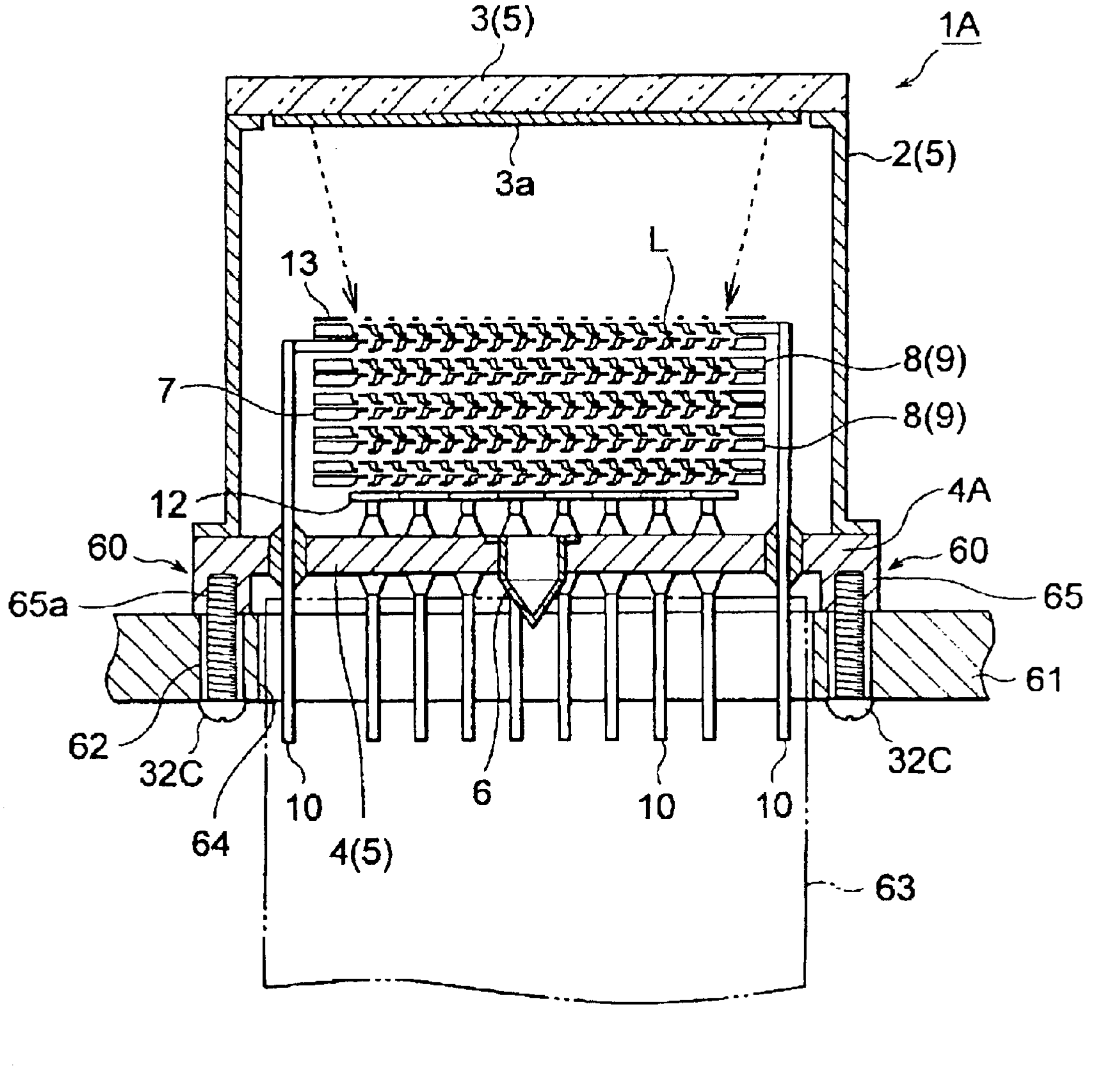
FIG. 15 is a cross-sectional view showing another embodiment of a photomultiplier tube according to the present invention.

The present invention is not limited to the preferred embodiment described above. For example, FIG. 15 shows another type of photomultiplier tube 1A having a stem plate 4A with screw portions 60. The screw portions 60 have annular spacers 65 in order to improve mountability. Female threads 65*a* are formed at predetermined positions on the bottom surface of the spacers 65. The photomultiplier tube 1A is fixed to a base 61 of a common photodetector. Hence, screw insertion holes 62 are formed in the base 61 at positions corresponding to the screw portions 60. Socket openings 64 are formed in the base 61 for inserting a socket 63 into the stem pins 10. Screws 32C (male screws) are screwed into the female threads 65*a* of the screw portions 60 through the screw insertion holes 62, thereby fixing the photomultiplier tube 1A to the base 61.

The circuit boards 33, 37, 50, and 55 are configured to have components required for the photomultiplier tube 1. The components may be changed appropriately depending on the application thereof. Further, the circuit boards 33 and 50 described above can also be formed of plastic or ceramics in a flat shape on which no circuit is mounted.

INDUSTRIAL APPLICABILITY

A photomultiplier tube, a photomultiplier tube unit, and a radiation detector according to the present invention have a lot of different applications in imaging devices for a low luminescent object, such as gamma cameras.

What is claimed is:

1. A photomultiplier tube comprising: a faceplate for receiving light incident thereon; a photocathode for emitting electrons in response to the light incident on the faceplate; a hermetically sealed vessel; an electron multiplier provided in the hermetically sealed vessel for multiplying electrons emitted from the photocathode; and an anode for generating an output signal based on electrons multiplied by the electron multiplier, wherein the hermetically sealed vessel includes:

a stem plate having an outer surface and, the stem plate being formed with stem pins for fixing the electron multiplier and the anode thereon;

a metal side tube enclosing the electron multiplier and the anode, the metal side tube having two open ends, one of the open ends being sealed to the stem plate; and the faceplate sealed to the other open end of the side tube, the faceplate being made from glass, and wherein a plurality of screw means is provided at the outer surface of the stem plate.

2. The photomultiplier tube according to claim 1, wherein at least one of the plurality of screw means includes a spacer projecting from the outer surface of the stem plate, the spacer having a female thread in the interior thereof.

3. The photomultiplier tube according to claim 2, wherein the photomultiplier tube further comprises:

a circuit board extending parallel to the stem plate and electrically connected to the stem pins, the circuit board being secured to the stem plate by screwing a male screw member into at least one of the plurality of screw means.

4. The photomultiplier tube according to claim 2, wherein the photomultiplier tube further comprises a first circuit board detachable from the stem plate, the first circuit board being secured to the stem plate by screwing a screw member into at least one of the plurality of screw means through the first circuit board.

5. A photomultiplier tube comprising: a faceplate for receiving light incident thereon; a photocathode for emitting electrons in response to the light incident on the faceplate; a hermetically sealed vessel; an electron multiplier provided in the hermetically sealed vessel for multiplying electrons emitted from the photocathode; and an anode for generating an output signal based on electrons multiplied by the electron multiplier, wherein the hermetically sealed vessel includes:

a stem plate having an outer surface, the stem plate being formed with stem pins for fixing the electron multiplier and the anode thereon;

a metal side tube enclosing the electron multiplier and the anode, the metal side tube having two open ends, one of the open ends being sealed to the stem plate; and the faceplate sealed to the other open end of the side tube, the faceplate being made from glass, the photomultiplier tube further comprises:

screw means provided at the outer surface of the stem plate; and a circuit board extending parallel to the stem plate and electrically connected to the stem pins, the circuit board being secured to the stem plate by screwing a male screw member into the screw means.

6. A photomultiplier tube comprising: a faceplate for receiving light incident thereon; a photocathode for emitting electrons in response to the light incident on the faceplate; a hermetically sealed vessel; an electron multiplier provided in the hermetically sealed vessel for multiplying electrons emitted from the photocathode; and an anode for generating an output signal based on electrons multiplied by the electron multiplier, wherein the hermetically sealed vessel includes:

a stem plate having an outer surface, the stem plate being formed with stem pins for fixing the electron multiplier and the anode thereon;

a metal side tube enclosing the electron multiplier and the anode, the metal side tube having two open ends, one of the open ends being sealed to the stem plate; and the faceplate sealed to the other open end of the side tube, the faceplate being made from glass, the photomultiplier tube further comprises:

screw means provided at the outer surface of the stem plate; and a first circuit board detachable from the stem plate, the first circuit board being secured to the stem plate by screwing a screw member into the screw means through the first circuit board.

7. The photomultiplier tube according to claim 6, wherein the screw means includes a spacer projecting from the outer surface of the stem plate, the spacer being integral with the stem plate and made from the same material as the stem plate, the spacer spacing the first circuit board away from the stem plate.

8. The photomultiplier tube according to claim 7, wherein the screw member is made from an electrically insulating material.

9. The photomultiplier tube according to claim 6, wherein the screw means includes a spacer projecting from the outer surface of the stem plate, the spacer being made from an electrically insulating material, the spacer spacing the first circuit board away from the stem plate.

10. The photomultiplier tube according to claim 9, wherein the screw member is made from an electrically insulating material.

11. The photomultiplier tube according to claim 6, wherein the photomultiplier tube comprises a second circuit board detachable from the stem plate and the first circuit board, and the first and second circuit boards being secured to the stem plate by screwing the screw member into the screw means through the first and second circuit boards.

12. A photomultiplier tube unit comprising a plurality of photomultiplier tubes that are juxtaposed, each of the plurality of the photomultiplier tubes having a faceplate for receiving light incident thereon; a photocathode for emitting electrons in response to the light incident on the faceplate; a hermetically sealed vessel; an electron multiplier provided in the hermetically sealed vessel for multiplying electrons emitted from the photocathode; and an anode for generating an output signal based on electrons multiplied by the electron multiplier, wherein the hermetically sealed vessel includes:

a stem plate having an outer surface, the stem plate being formed with stem pins for fixing the electron multiplier and the anode thereon;

a metal side tube enclosing the electron multiplier and the anode, the side tube having two open ends, one of the open ends being sealed to the stem plate; and the faceplate sealed to the other open end of the side tube, the faceplate being made from glass, and wherein screw means is provided on the outer surface of the stem plate, the hermetically sealed vessels are secured on a single substrate by screwing male screw members into the screw means while the hermetically sealed vessels are juxtaposed on the substrate.

13. The photomultiplier tube unit according to claim 12, wherein the substrate is a circuit board electrically connectable to the stem pins, and the male screw members are electrically insulating screws.

14. A radiation detector comprising a scintillator for emitting fluorescent light in response to radiation generated from an object; a plurality of photomultiplier tubes, each of the plurality of photomultiplier tubes having a faceplate for receiving the fluorescent light, a photocathode for emitting electrons in response to the fluorescent light incident on the faceplate; a hermetically sealed vessel; an electron multiplier provided in the hermetically sealed vessel for multiplying electrons emitted from the photocathode; and an anode for producing an output signal based on electrons multiplied by the electron multiplier, the plurality of photomultiplier tubes being arranged in a manner that the faceplates of the photomultiplier tubes face the scintillator, each of the photomultiplier tubes generating an electrical charge based on the fluorescent light emitted from the scintillator; and a position calculating processor for processing an output from the photomultiplier tube and generating a signal for indicating a position of radiation generated in the object, wherein the hermetically sealed vessel includes:

a stem plate having an outer surface, the stem plate being formed with stem pins for securing the electron multiplier and the anode thereon;

a metal side tube enclosing the electron multiplier and the anode, the side tube having two open ends, one of the open ends being sealed to the stem plate; and the faceplate fixed to the other open end of the side tube, the faceplate being made from glass, and wherein screw means is provided at the outer surface of the stem plate, and the hermetically sealed vessels are arranged and secured to a single substrate by screwing male screw members into the screw means while the hermetically sealed vessels are juxtaposed on the substrate.

* * * * *